(12) United States Patent
Rarick

(10) Patent No.: US 8,250,126 B2
(45) Date of Patent: Aug. 21, 2012

(54) EFFICIENT LEADING ZERO ANTICIPATOR

(75) Inventor: Leonard D. Rarick, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1272 days.

(21) Appl. No.: 11/964,611

(22) Filed: Dec. 26, 2007

(65) Prior Publication Data

US 2009/0172054 A1 Jul. 2, 2009

(51) Int. Cl.
*G06F 7/00* (2006.01)
*G06F 15/00* (2006.01)
*G06F 7/42* (2006.01)

(52) U.S. Cl. .......... 708/211; 708/205; 708/505

(58) Field of Classification Search ........ 708/210–211
See application file for complete search history.

(56) References Cited

U.S. PATENT DOCUMENTS

| | | | | |
|---|---|---|---|---|
| 5,343,413 A | * | 8/1994 | Inoue | 708/205 |
| 5,493,520 A | * | 2/1996 | Schmookler et al. | 708/211 |
| 5,633,819 A | * | 5/1997 | Brashears et al. | 708/505 |
| 5,732,007 A | * | 3/1998 | Grushin et al. | 708/505 |
| 5,831,884 A | * | 11/1998 | Suzuki | 708/505 |
| 6,654,775 B1 | * | 11/2003 | Ott | 708/211 |
| 7,024,439 B2 | * | 4/2006 | Hoskote | 708/211 |
| 7,899,860 B2 | * | 3/2011 | Visalli et al. | 708/710 |

OTHER PUBLICATIONS

M. Schmookler and K. Nowka, "Leading Zero Anticipator and Detection: A Comparison of Methods," Proc. 15th Symp. Computer Arithmetic, Jun. 2001.*

* cited by examiner

*Primary Examiner* — Chat Do
*Assistant Examiner* — Matthew Sandifer
(74) *Attorney, Agent, or Firm* — Park, Vaughan, Fleming & Dowler LLP; Anthony Jones

(57) ABSTRACT

Embodiments of the present invention provide a system that estimates the location of the leading zero or the leading one in the result of an addition of floating-point numbers A and B. The system includes a half-adder circuit associated with each separate bit position i in A and B. The half-adder circuits compute a sum (S) for the associated bit position of A and B and a carry (K) for a next bit position of A and B. The system also includes a set of estimation circuits coupled to the set of half-adder circuits. The set of estimation circuits computes an estimate for the location of the leading zero or the leading one in the result from the K and S computed by each half-adder circuit.

15 Claims, 10 Drawing Sheets

EFFICIENT LEADING ZERO ANTICIPATOR

BACKGROUND

1. Field of the Invention

Embodiments of the present invention relate to techniques for performing mathematical operations in a computer system. More specifically, embodiments of the present invention relate to a technique for efficiently estimating the position of the leading zero or the leading one in the result of a floating-point ADD operation.

2. Related Art

The floating-point ADD operation is performed with hardware support in most computer systems. Because floating-point ADD operations include several separate constituent operations, the floating-point ADD operation is one of the slower mathematical operations on a computer system. Computer system designers have attempted to improve the performance of the floating-point ADD operation by parallelizing its constituent operations. To this end, some computer system designers have included a leading zero anticipator (LZA) (sometimes called a "leading zero estimator") in floating-point circuitry to perform the floating-point ADD operation more efficiently.

LZAs predict the location of the leading (most significant) zero or the leading one bit of the result of a floating-point ADD operation in parallel with the ADD operation. More specifically, the LZA estimates the position of the left-most zero bit in the result of the addition if the result is negative or the left-most one bit in the result if the result is positive. The estimate is then used to shift the mantissa of the result when normalizing the result following the floating-point ADD operation.

In order to estimate a location for the leading zero or the leading one, some LZAs compute a "propagate bit," a "generate bit," and a "kill bit" for each separate bit position i. (Note that the index i increases from left to right.) These bits can be denoted as T, G, and Z where T is a propagate bit, G is a generate bit, and Z is a kill bit. Assuming that two terms, A and B, are to be added together (where $A_i$ denotes the ith bit in A and $B_i$ denotes the ith bit in B), T, G and Z can be determined for each bit position i in A and B as follows:

$T_i = A_i \text{ XOR } B_i$;

$G_i = A_i \text{ AND } B_i$; and $Z_i = \text{NOT}(A_i \text{ OR } B_i)$, where "NOT" represents a logical inversion.

Moreover, T, G and Z can be used to compute the location of the leading zero or the leading one using the expressions, $f_0 = \text{NOT}(T_0) \text{ AND } T_i$, and $f = T_{i-1} \text{ AND } ((G_i \text{ AND NOT}(Z_{i+1})) \text{ OR } (Z_i \text{ AND NOT } (G_{i+1}))) \text{ OR NOT}$ $(T_{i-1}) \text{ AND } ((Z_i \text{ AND NOT}(Z_{i-1})) \text{ OR } (G_i \text{ AND NOT } (G_{i+1})))$, where $i > 0$.

In the expression above for $f_i$, if $f_i$ is equal to one (i.e., the "indicator" is "set") for a given position and no other position of greater significance has its indicator set, then the leading digit is at either i or i+1.

Along with computing $f_i$, a few common LZA techniques are described in "Leading Zero Anticipation and Detection—A Comparison of Methods" by Martin S Schmookler and Kevin J Nowka, IEEE 2001, 0-7695-1150-3/01, page 8 (hereinafter "Schmookler"). In this paper, Schmookler describes how, for positive results of a floating-point addition, the first (from left to right) occurrence of $T_{i-1}$ XOR NOT $(Z_i) = 1$ provides the index of i such that the leading one is in either location i−1 or i (for leading-zero detection). Although not described in Schmookler, in a limited number of cases where the floating-point addition generates a negative result, the first occurrence of $T_{i-1}$ XOR NOT$(Z_i) = 1$ also provides the index of i such that the leading zero bit is in location i or i+1 (for leading-one detection).

Generally, common high-efficiency LZA implementations require a dozen gates or more in each bit position to compute the estimate for all cases (i.e., for both positive and negative results). Because the operands can include 32, 64, or more bits, the LZA can require a significant amount of integrated circuit area and can consume a significant amount of power.

Hence, what is needed is an LZA which is more efficient than the above-described LZAs.

SUMMARY

Embodiments of the present invention provide a system that estimates the location of the leading zero or the leading one in the result of an addition of floating-point numbers A and B. The system includes a half-adder circuit associated with each separate bit position i in A and B. The half-adder circuits compute a sum (S) for the associated bit position of A and B and a carry (K) for a next bit position of A and B. The system also includes a set of estimation circuits coupled to the set of half-adder circuits. The set of estimation circuits computes an estimate for the location of the leading zero or the leading one in the result from the K and S computed by each half-adder circuit.

In some embodiments, each half-adder circuit includes: (1) an XOR gate to calculate $S_i = A_i \text{ XOR } B_i$; and (2) an AND gate to calculate $K_{i-1} = A_i \text{ AND } B_i$, for each separate bit position i in A and B.

In some embodiments, each estimation circuit includes: (1) an XOR gate to calculate $T_{i-1} = S_{i-1} \text{ XOR } K_{i-1}$; (2) an OR gate to calculate $\text{NOT}(Z_i) = S_i \text{ OR } K_i$; and (3) an XOR gate to calculate $R_i = T_{i-1} \text{ XOR NOT}(Z_i)$, for each separate bit position i in A and B. In these embodiments, if the result is positive, a first occurrence from left to right of $R_i = 1$ provides a value of i such that the leading one is at location i or i−1 in the result, and if the result is negative, the first occurrence from left to right of $R_i = 1$ provides the value of i such that the leading zero is at location i or i+1 in the result.

In some embodiments, each estimation circuit includes: (1) an XOR gate to calculate $T_{i-1} = S_{i-1} \text{ XOR } K_{i-1}$; (2) a NOR gate to calculate $Z_i = \text{NOT}(S_i \text{ OR } K_i)$; and (3) an XOR gate to calculate $R_i = \text{NOT}(T_{i-1} \text{ XOR } Z_i)$ for each separate bit position i in A and B. In these embodiments, if the result is positive, a first occurrence from left to right of $R_i = 1$ provides a value of i such that the leading one is at location i or i−1 in the result, and if the result is negative, the first occurrence from left to right of $R_i = 1$ provides the value of i such that the leading zero is at location i or i+1 in the result.

In some embodiments, each estimation circuit comprises an OR gate to calculate $R\_LIM_i = R_i \text{ OR } LIM_i$, wherein $LIM_i = 1$ for a bit position i such that the result cannot be shifted beyond i without underflowing.

In some embodiments, the system includes a shift-and-complement circuit coupled to a circuit that computes the result of the addition of floating-point numbers A and B, wherein the shift-and-complement circuit includes a set of two-input multiplexers. Each multiplexer receives as inputs the value of bit position i of the result and the inverted value of bit position i+1 of the result. In these embodiments, if the result is negative, the inverted value of bit position i+1 is selected as an output from each multiplexer, and if the result is positive, the value of bit position i is selected as the output from each multiplexer. Following the shift-and-complement circuit, the first occurrence from left to right of $R_i=1$ provides the value of i such that the leading zero is at location i or i−1 in the result. Note that the bits to the right of the least significant bit (LSB) of the result are zero, so the inverted value for these bit positions is one.

In some embodiments, each estimation circuit includes: (1) an XOR gate to calculate $S_i=A_i$ XOR $B_i$; (2) an AND gate to calculate $K_i=A_{i+1}$ AND $B_{i+1}$; (3) an XOR gate to calculate $T_i=S_i$ XOR $K_i$; (4) a NOR gate to calculate $Z_i=\text{NOT}(S_i$ OR $K_i)$; (5) a NOR gate to calculate $LZ_i=\text{NOT}(T_{i-1}$ OR $Z_i)$; (6) an AND gate to calculate $LO_i=T_{i-2}$ AND $Z_{i-1}$; and (7) an OR gate to calculate $R_i=LO_i$ OR $LZ_i$. In these embodiments, for a positive result or negative result that has been complemented, a first occurrence from left to right of $R_i=1$ provides a value of i such that the leading one is at location i or i−1 in the result.

In some embodiments, the OR gate used to calculate $R_i$ further comprises an input $LIM_i$, wherein the OR gate calculates $R_i=(LZ_i$ OR $LO_i$ OR $LIM_i)$, wherein $LIM_i=1$ for a bit position i such that the result cannot be shifted beyond i without underflowing.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide a leading zero anticipator (LZA) that is used to predict the location of the leading (most significant) zero or the leading one bit of the result of a floating-point ADD operation. The LZA operates in parallel with a circuit element that performs the ADD operation (e.g., an adder or an ALU) and the predicted location is used to normalize the result of the ADD operation immediately after the result is computed.

Embodiments of the present invention use a set of half-adders to compute $S_i$ and $K_i$ for each separate bit position i in a pair of floating-point inputs A and B, where i increases from left to right. From the $S_i$ and $K_i$, these embodiments compute the predicted location of the leading zero or the leading one. In embodiments of the present invention, the LZA uses significantly less area and power as compared to existing LZA implementations.

Floating-Point Data Format

Figure 1:
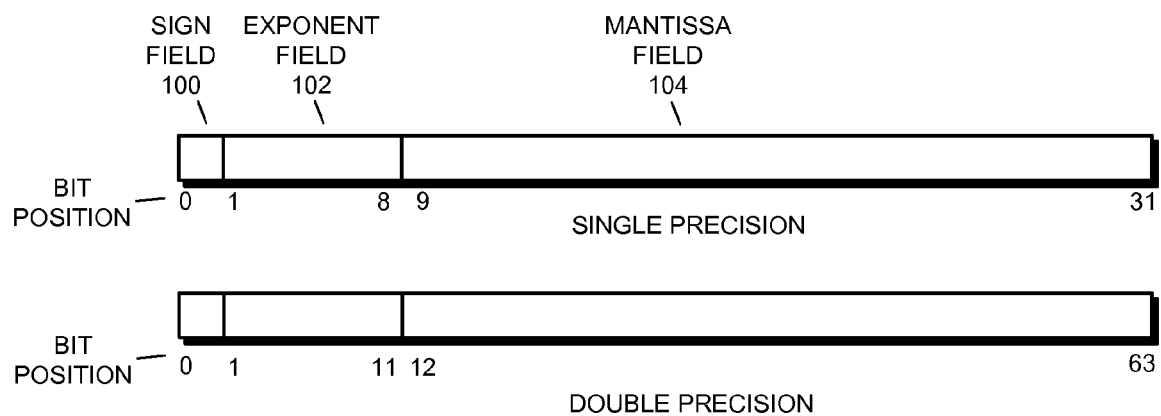
FIG. 1 presents a floating-point data format in accordance with embodiments of the present invention.

FIG. 1 presents a floating-point data format in accordance with embodiments of the present invention. This floating-point data format includes a sign field 100, an exponent field 102, and a mantissa field 104. In the single-precision format, a floating-point number includes 32 bits, whereas in the double-precision format the floating-point number includes 64 bits.

The value of the floating-point number is equal to the value in mantissa field 104 times 2 raised to the value in exponent field 102 minus a bias. Note that sign field 100 indicates whether the value of the floating-point number is positive or negative (i.e., "0" indicates a positive number).

The floating-point data format includes an "implicit bit" in addition to the explicit bits in the mantissa. This implicit bit represents the most significant bit (MSB) of the mantissa of the floating-point number. The implicit bit is not stored in mantissa field 104, but instead can be determined based on the value in exponent field 102. For example, if exponent field 102 is all zeros, the implicit bit is zero. However, if exponent field 102 is non-zero, the implicit bit is one. Processor 202 (see FIG. 2) includes the implicit bit when using a floating-point number in a calculation.

Computer System

Figure 2:
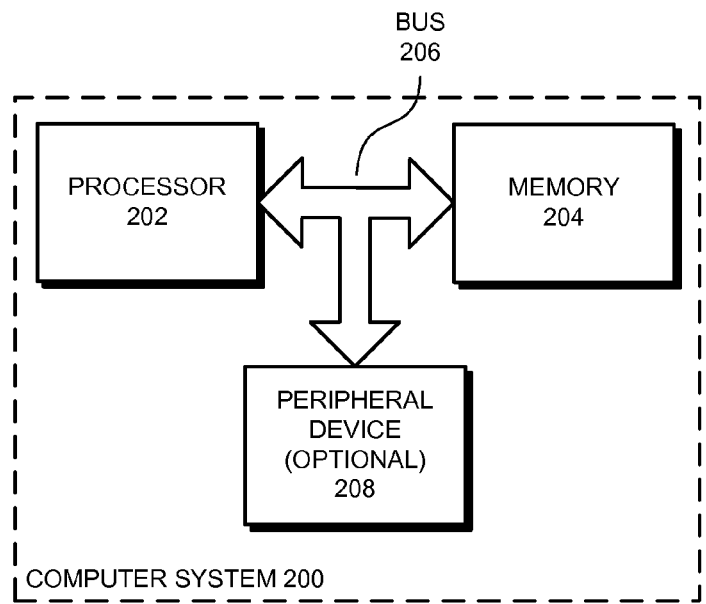
FIG. 2 presents a computer in accordance with embodiments of the present invention.

FIG. 2 presents a computer system 200 in accordance with embodiments of the present invention. Computer system 200 includes processor 202, memory 204, and bus 206. Processor 202 includes circuitry that performs processing operations such as floating-point arithmetic operations. Memory 204 stores instructions and/or data for use by processor 202. Memory 204 can be volatile memory, such as dynamic RAM (DRAM) or non-volatile memory such as a disk drive or a high-capacity solid-state memory (or a combination of volatile and non-volatile memory). Processor 202 and memory 204 communicate using bus 206.

Although we use processor 202 and memory 204 as exemplary components in computer system 200, in alternative embodiments different types of components can be present in computer system 200. For example, computer system 200 may include a number of peripheral devices 208 coupled to processor 202 and/or memory 204.

Computer system 200 can be part of an electronic device such as a desktop or laptop computer, a cell phone, a personal digital assistant (PDA), a camera, a calculator, an appliance, a networking device, a controller, and any other electronic device.

In embodiments of the present invention, processor 202 includes a functional unit (e.g., an adder or ALU) for performing floating-point arithmetic operations.

This functional unit performs a floating-point ADD (for floating-point numbers X and Y) as described in the following example. In this example, we assume that the exponent of Y is y and the exponent of X is x. We also swap X and Y if the exponent of y is greater than the exponent of X.

1. Convert the representations for X and Y to an internal format, explicitly representing the implicit bit.
2. If necessary, align the value for Y so that the exponents of X and Y are the same. For example, the alignment can involve adding x-y to Y's exponent and shifting the MSB of Y's mantissa by x-y to compensate for the change in exponent.
3. Add the mantissa of X and the mantissa of the adjusted Y together.
4. If the sum of the mantissas does not have the of value 1 in the most significant bit (MSB) (including the implicit bit), then shift (normalize) the mantissa to move the most significant bit into the MSB position, which involves adjusting the exponent until the mantissa has a 1 in the MSB.

In embodiments of the present invention, in parallel with the adding operation (step 3, above), the LZA estimates the amount of shift (normalization) required for the mantissa (in step 4). Using this shift value, these embodiments can complete the shift operation as soon as the ADD operation is completed.

Although we describe an ADD operation with a positive result, ADD operations with negative results or subtract (SUB) operations are completed in a similar way. However, these operations can involve additional step(s). For example, they may involve complementing (e.g., converting an operand to a two's complement) and/or shifting the result.

Some embodiments of the present invention determine if the shift operation (in step 4) will cause the value of the number to become invalid (e.g., underflow). These embodiments can limit the shift operation to prevent the final result from being invalid.

Half-Adder

Figure 3:
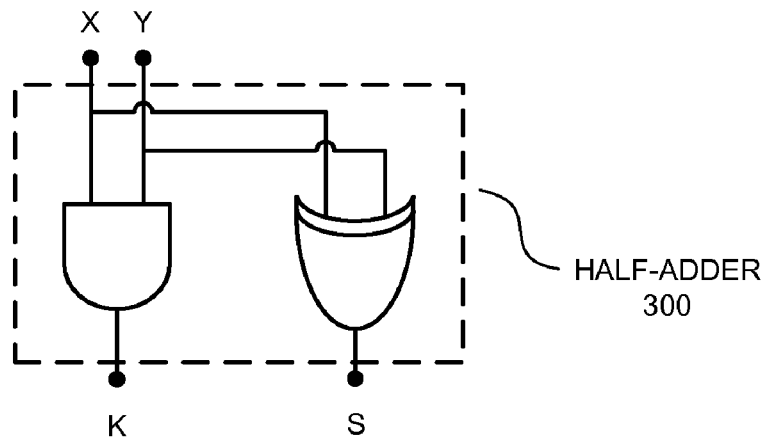
FIG. 3 presents a circuit diagram of a half-adder in accordance with embodiments of the present invention.

In embodiments of the present invention processor 202 also includes a set of half-adders. More specifically, FIG. 3 presents a circuit diagram of a half-adder 300 in accordance with embodiments of the present invention. Half-adder 300 has two inputs, X and Y, and two outputs, S (sum) and K (carry). Note that S is the one-bit result of the binary addition of X and Y (S=X XOR Y), while K is the value that is carried out from the addition of X and Y (K=X AND Y).

Processor 202 uses the half-adders to compute S and K for each separate bit position i of floating-point numbers A and B. Embodiments of the present invention input S and K into an LZA to determine the location of the leading zero or the leading one in a floating-point ADD result as described in the following sections.

Leading Zero Anticipator

Embodiments of the present invention include an LZA that is used to predict the location of the leading zero or the leading one bit of the result of a floating-point ADD operation in parallel with the ADD operation. In other words, the LZA estimates the location of the left-most zero bit in the result if the result is negative or the left-most one bit in the result of the addition if the result is positive. The estimate is then used to normalize the result of the floating-point ADD operation (i.e., to shift the mantissa of the result).

In the following discussion, we refer to two general sequence formats encountered by the LZA. The sequences represent the results of the computations of T=A XOR B, G=A AND B, and Z=NOT(A OR B) for the individual bit positions in floating-point operands (where T is the propagate bit, G is the generate bit, and Z is the kill bit). Note that each position in the following sequences contains a result computed from a corresponding bit position in the floating-point numbers A and B, but is not denoted $T_i$ etc. for clarity and brevity.

For leading-zero detection (i.e., where the sum is positive, so there are leading zeros and we need to find the left-most one), the sequence is:

TTTTTTTTTTTTTTTGZZZZZZZZZZZZZZ? ..., where "?" represents NOT(Z). Generally, any number of Ts (including zero) may occur. After the last T from left to right, there is a G. However, if there are no Ts, the sequence may or may not start with a G. In addition, there may be any number of Zs, including zero. The location of the ? provides the value of i such that the leading one is in location i or i−1. Note that for this sequence, the first occurrence of $(T_{i-1} \text{ XOR NOT}(Z_i))$ =1 is located at the "?."

On the other hand, for leading-one detection (i.e., where the sum is negative, so there are leading ones and we need to find the left-most zero), the sequence is:

TTTTTTTTTTTTTTTZGGGGGGGGGGGGGG? ..., where "?" represents NOT(G). Any number of Ts (including zero) may occur. After the last T, there is a Z (because the occurrence of a G indicates a leading zeros case instead of a leading ones case). After this Z, any number of Gs, including zero, may occur. The location of the "?" provides the value i such that the leading zero is in location i or i+1 (but not i−1). Note that for this sequence, the first occurrence of $(T_{i-1}$ XOR NOT$(Z_i))$=1 is located at the Z which is at location i+1 only if there are no Gs.

As mentioned above, embodiments of the present invention use half-adders when determining the location of the leading zero or the leading one in the floating-point ADD result. Given the sequence for leading-zero detection, the half-adders do not cause a significant change in the values in the sequence. Assuming that the sequence before the half-adders is:

TTTTTTTTTTTTTTTGZZZZZZZZZZZZZZ? ..., the sequence after the half-adders is:

TTTTTTTTTTTTTTGZZZZZZZZZZZZZZZ? ... or
TTTTTTTTTTTTTTGZZZZZZZZZZZZZZZT ....

Where there cannot be a carry in the sum beyond the last T position shown in the second possible sequence. Note that the G has moved one place to the left.

On the other hand, for the leading-one detection sequence above, all the consecutive Gs after the Z are eliminated by the half-adders. Assuming that "?"=Z, before the half-adders the sequence is:

TTTTTTTTTTTTTTTZGGGGGGGGGGGGGGZ ..., whereas after the half-adders the sequence is:

TTTTTTTTTTTTTTTTTTTTTTTTTTTTTTZ ...

and there is not a carry in the sum into the last Z position shown because "?"=Z. Alternatively, assuming that "?"=T, before the half-adders the sequence is:

TTTTTTTTTTTTTTTZGGGGGGGGGGGGGGT ...

whereas after the half-adders the sequence is:

TTTTTTTTTTTTTTTTTTTTTTTTTTTTTZT ... or
TTTTTTTTTTTTTTTTTTTTTTTTTTTTTTZ? ...

and there is no carry in the sum into the last Z position (in the second post-half-adder sequence).

Although the expression $T_{i-1}$ XOR NOT($Z_i$)=1 does not always provide an accurate estimation of the location of the leading one (i.e., for a negative result), the expression always provides an accurate estimate of the location of the leading one in the case where there are no Gs after the Z. Hence, this expression provides an accurate estimate for a negative result when applied to the output of the half-adders.

Figure 4:
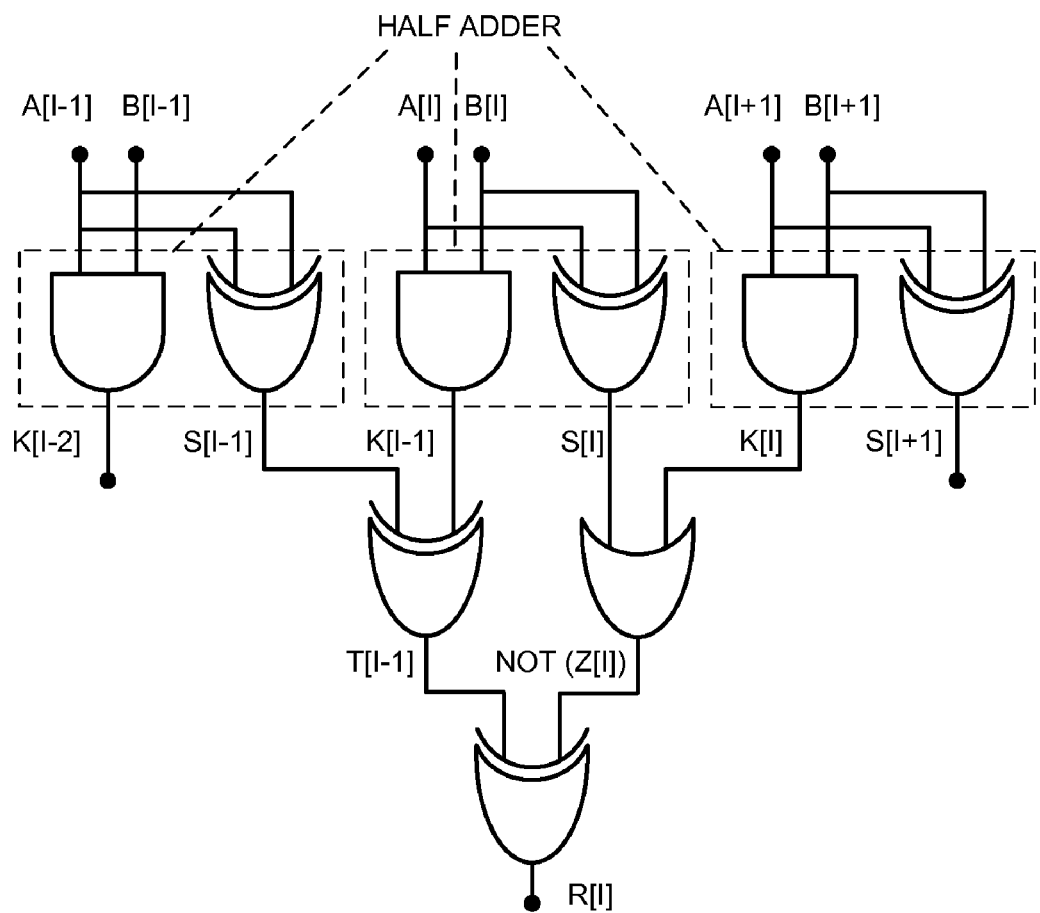
FIG. 4 presents a circuit diagram of a circuit that computes $R_i=T_{i-1}$ XOR $\text{NOT}(Z_i)$ for a separate bit position i in accordance with embodiments of the present invention.

Assuming that $S_i$ is the sum output and $K_i$ is the carry output of a half-adder for position i (i.e., $S_i$=$A_i$ XOR $B_i$ and $K_i$=$A_{i-1}$ AND $B_{i-1}$), embodiments of the present invention compute $T_i$ and $Z_i$ in terms of $S_i$ and $K_i$ instead of A and B. In turn, $T_i$ and $Z_i$ are used to compute the location of the leading zero or the leading one in the result from the floating-point ADD of A and B by determining the result of the expression $T_{i-1}$ XOR NOT($Z_i$)=1 (where $T_{i-1}$=$S_{i-1}$ XOR $K_{i-1}$ and $Z_i$=NOT($S_i$ OR $K_i$)) for each separate bit position i. FIG. 4 presents a circuit diagram of a circuit that computes $R_i$=$T_{i-1}$ XOR NOT($Z_i$) for a separate bit position i in accordance with embodiments of the present invention. The circuit in FIG. 4 computes $R_i$ using 5 gates for each position using the following logical expressions:

$S_i$=$A_i$ XOR $B_i$; //half-adder sum $K_i$=$A_{i+1}$ AND $B_{i+1}$; //half-adder carry $T_{i-1}$=$S_{i-1}$ XOR $K_{i-1}$; //$T_{i-1}$ NOT($Z_i$)=$S_i$ OR $K_i$; and //NOT($Z_i$)

$R_i$=$T_{i-1}$ XOR NOT($Z_i$). //stop position

For positive addition results (leading-zero detection), the first (from left to right) occurrence of $R_i$=1 provides the value of i such that the leading one is at location i or i−1 in the result from the floating-point addition. On the other hand, for negative addition results (leading-one detection), the first (from left to right) occurrence of $R_i$=1 provides the value of i such that the leading zero is at location i or i+1 in the result from the floating-point addition. Note that using the circuit in FIG. 4 there are three possible locations that may hold the leading bit in the result of the floating-point ADD operation. Specifically, the leading bit may be located at i−1, i, or i+1.

Complementing and Shifting a Negative Result

As is typically done during the floating-point ADD operation, embodiments of the present invention complement a negative result to compute the absolute value of the result (in order to make the result conform to the floating-point format). In addition, embodiments of the present invention that use the LZA in FIG. 4 shift the complemented result by one bit position to the left to make the result simpler for downstream circuits to use. Hence, after a negative result has been complemented and shifted, the first (from left to right) occurrence of $R_i$=1 provides the value of i such that the leading one is at location i or i−1. In other words, embodiments of the present invention that use the LZA in FIG. 4 provide an estimate of the location of the leading one for the complemented result that is limited to one of two locations (i or i−1), instead of the one of three locations (i, i−1, or i+1) that could have occurred (depending on the sign of the result) without the shifting operation.

These embodiments perform the complement-and-shift operation with negligible area and timing impact by using a two-input multiplexer in place of the XOR gates that are typically used to generate the complement. In other words, assuming that V is the result and N=1 if a negation is needed (i.e., if the result is negative), using a typical technique for negation: $W_i$=$V_i$ XOR N. On the other hand, in embodiments of the present invention an inverter and a multiplexer are used instead of the XOR gate: $W_i$=($V_i$ AND NOT(N)) OR (NOT($V_{i+1}$) AND N).

Figure 5A:
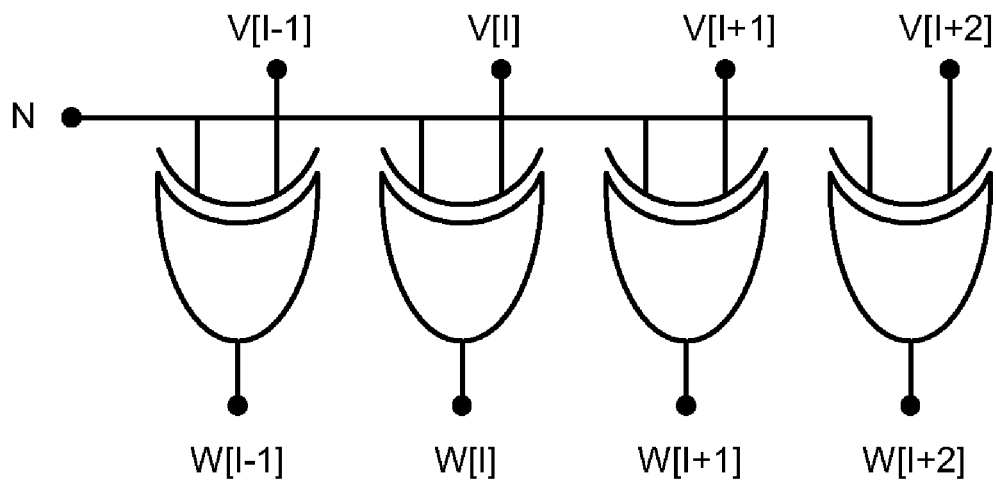
FIG. 5A presents a circuit diagram of a set of XOR gates that are used for providing a complement in a typical adder circuit.
Figure 5B:
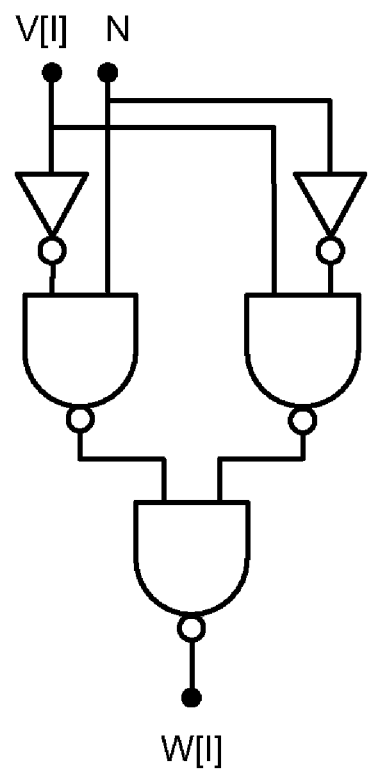
FIG. 5B presents a circuit diagram of the component gates of one of the XOR gates from FIG. 5A.
Figure 6A:
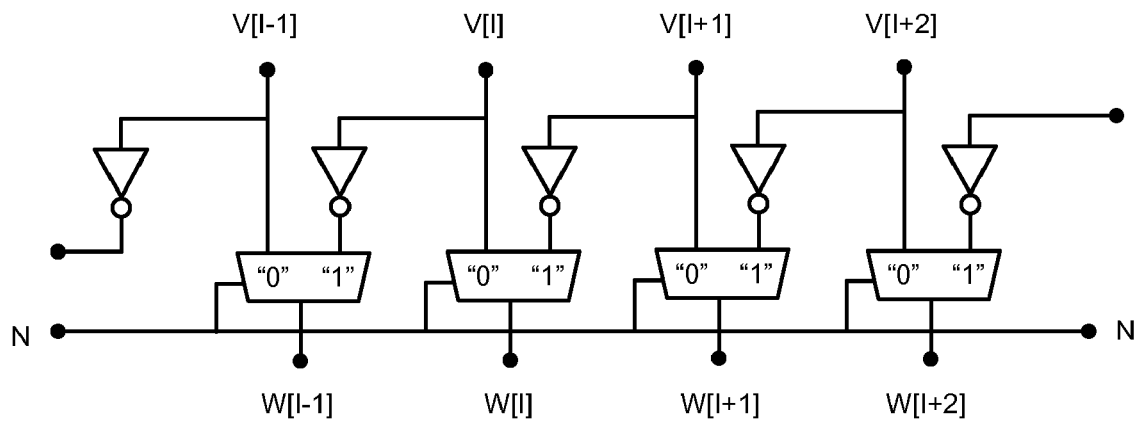
FIG. 6A presents a circuit diagram of a set of multiplexers for providing a shifted complement in accordance with embodiments of the present invention.
Figure 6B:
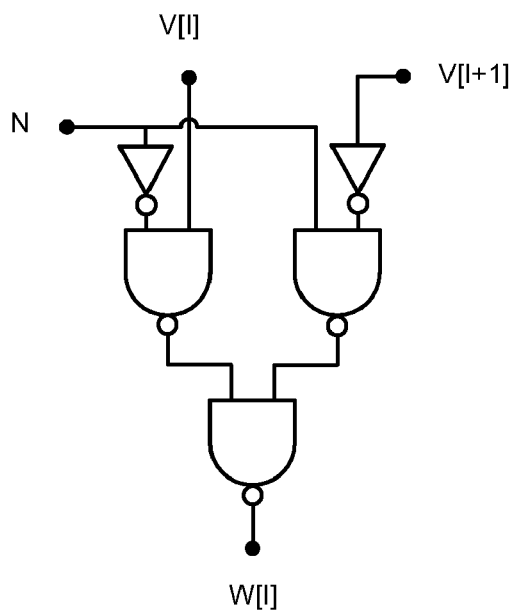
FIG. 6B presents a circuit diagram of the component gates of one of the multiplexers from FIG. 6A in accordance with embodiments of the present invention.

FIG. 5A presents a circuit diagram of a set of XOR gates that are used for providing a complement in a typical adder circuit and FIG. 5B presents a circuit diagram of the component gates of one of the XOR gates from FIG. 5A. On the other hand, FIG. 6A presents a circuit diagram of a set of inverters and multiplexers for providing the shifted complement and FIG. 6B presents a circuit diagram of the component gates for of one of the inverters and multiplexers from FIG. 6A in accordance with embodiments of the present invention. As can be seen in FIG. 5B and FIG. 6B, the two-input XOR and the inverter and the two-input multiplexer require approximately the same layout area and have approximately the same latency.

Underflow

Embodiments of the present invention that use the LZA in FIG. 4 prevent the result from being shifted if underflow would occur because of the shift. In other words, the result is shifted, but prevented from being shifted so much that the exponent would be less than a minimum expressible value (i.e., the smallest number that can be represented using the exponent of a floating-point number). These embodiments compute the following:

$S_i$=$A_i$ XOR $B_i$; //half-adder sum $K_i$=$A_{i+1}$ AND $B_{i+1}$; //half-adder carry $T_{i-1}$=$S_{i-1}$ XOR $K_{i-1}$; //$T_{i-1}$ NOT($Z_i$)=$S_i$ OR $K_i$; //NOT($Z_i$)

Figure 7:
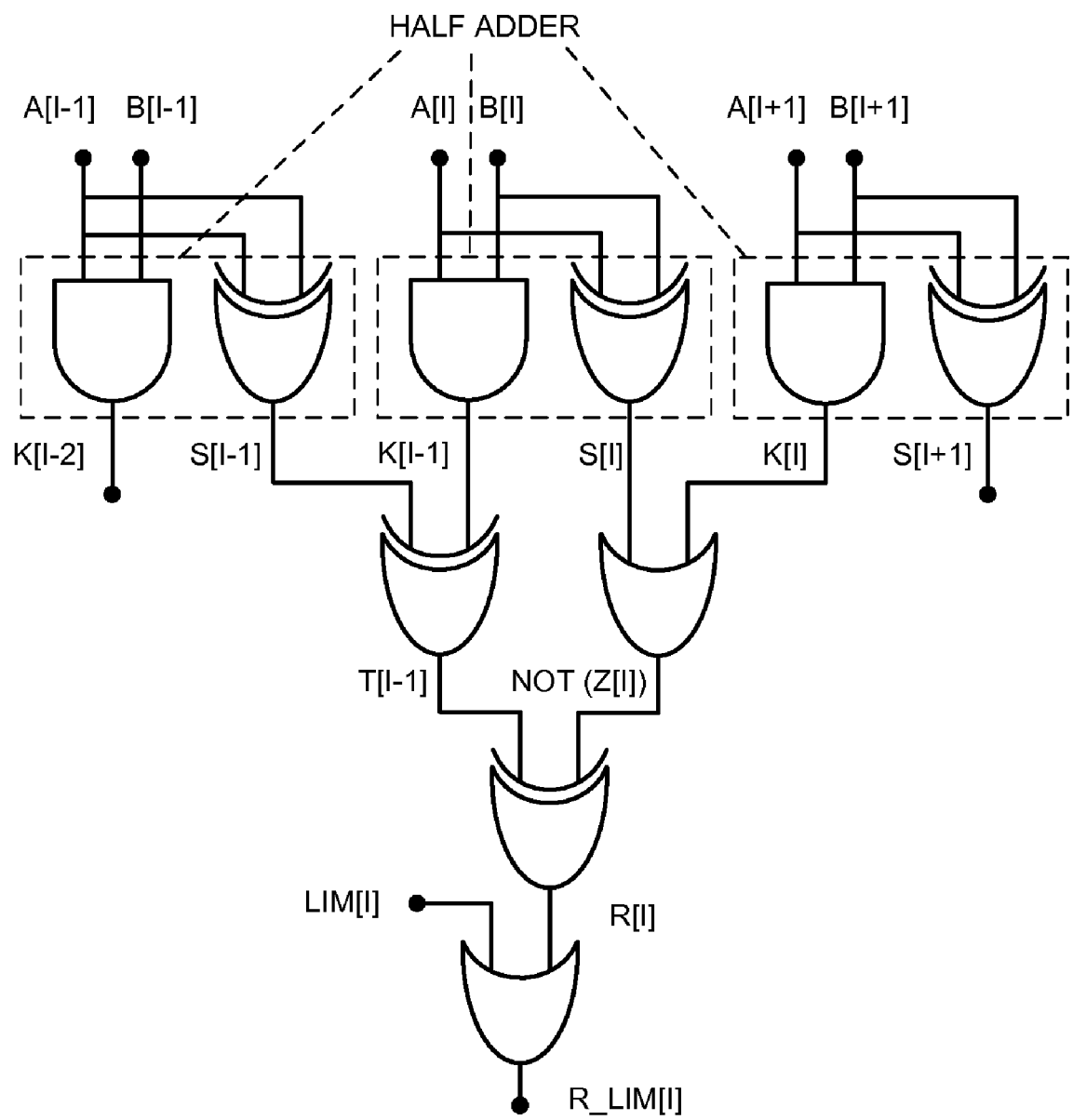
FIG. 7 presents a circuit diagram of a circuit that computes $R\_LIM_i=R_i$ OR $LIM_i$ in accordance with embodiments of the present invention.

$R_i$=$T_{i-1}$ XOR NOT($Z_i$); and //stop position $R\_LIM_i$=$R_i$ OR $LM_i$, //stop position+underflow limit where the $LIM_i$ signal equals one for the value of i that represents the largest shift possible without underflow. In some embodiments of the present invention, $LIM_i$ is computed from the exponent of floating-point numbers A and B. FIG. 7 presents a circuit diagram of a circuit that computes $R\_LIM_i$=$R_i$ OR $LIM_i$ in accordance with embodiments of the present invention. Note that $R\_LIM_i$ functions in the same way as $R_i$ when normalizing the result of the floating point ADD operation (i.e., $R\_LIM_i$ provides the index of i that indicates the leading one or the leading zero in the result from the floating point addition or prevents underflow).

Note that when a result cannot be shifted by the appropriate amount because underflow would occur, the result is called "denormal." Denormal results are handled by dedicated downstream circuits.

Leading Zero Anticipator

Alternative Embodiment

In some embodiments of the present invention, the LZA determines whether there will be a positive result (a leading zeros case) or a negative result (a leading ones case). In these embodiments, the LZA also specifies a location i such that the leading one (after negation, if needed) is always in location i or i−1. In other words, given either a positive result or a negative result, the LZA provides an estimate of the location of the leading one in either of two locations.

Figure 8:
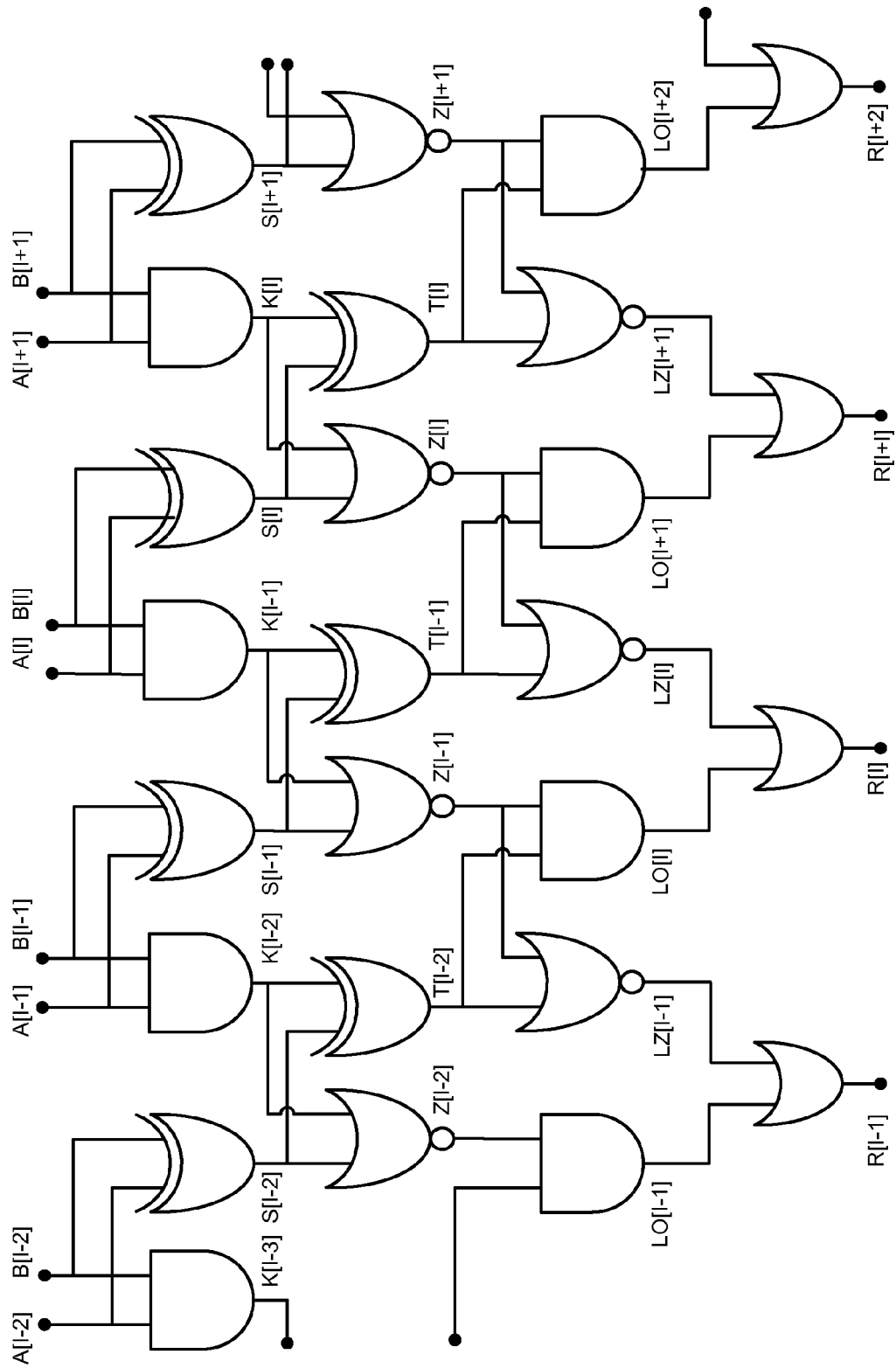
FIG. 8 presents a circuit diagram of a circuit that computes $R_i=LO_i$ OR $LZ_i$ in accordance with embodiments of the present invention.

These embodiments use half-adders to compute S and K before computing the following values:

$S_i = A_i$ XOR $B_i$; //half-adder sum $K_i = A_{i+1}$ AND $B_{i+1}$; //half-adder carry $T = S_i$ XOR $K_i$; //T $Z_i = $ NOT$(S_i$ OR $K_i)$; //Z $LZ_i = $ NOT$(T_{i-1}$ OR $Z_i)$; //leading zero detect $LO_i = T_{i-2}$ AND $Z_{i-1}$; and //leading one detect $R_i = LO_i$ OR $LZ_i$. //stop position FIG. 8 presents a circuit diagram of a circuit that computes $R_i = LO_i$ OR $LZ_i$ in accordance with embodiments of the present invention. The circuit computes $R_i$ using seven gates instead of the five shown in FIG. 4. However, the area and latency of this circuit are approximately the same as the prior circuit. That is, the first four gates of these two circuits are approximately the same in speed and area, while the final XOR gate in the circuit in FIG. 4 is approximately the same area and speed as the final three gates used in the circuit in FIG. 8 (recall that the component gates of a typical XOR gate are shown in FIG. 5B). Moreover, because the circuit in FIG. 8 computes $R_i$ that results in a prediction of one of only two locations, the result is not shifted.

Underflow

Embodiments of the present invention that use the LZA in FIG. 8 prevent the circuit from shifting (i.e., normalizing the result) if underflow would occur because of the shift. These embodiments allow the result to be shifted, but prevent the result from being shifted so much that the exponent would be less than a minimum expressible value (i.e., the smallest number that is allowed to be represented using a floating-point number).

Figure 9:
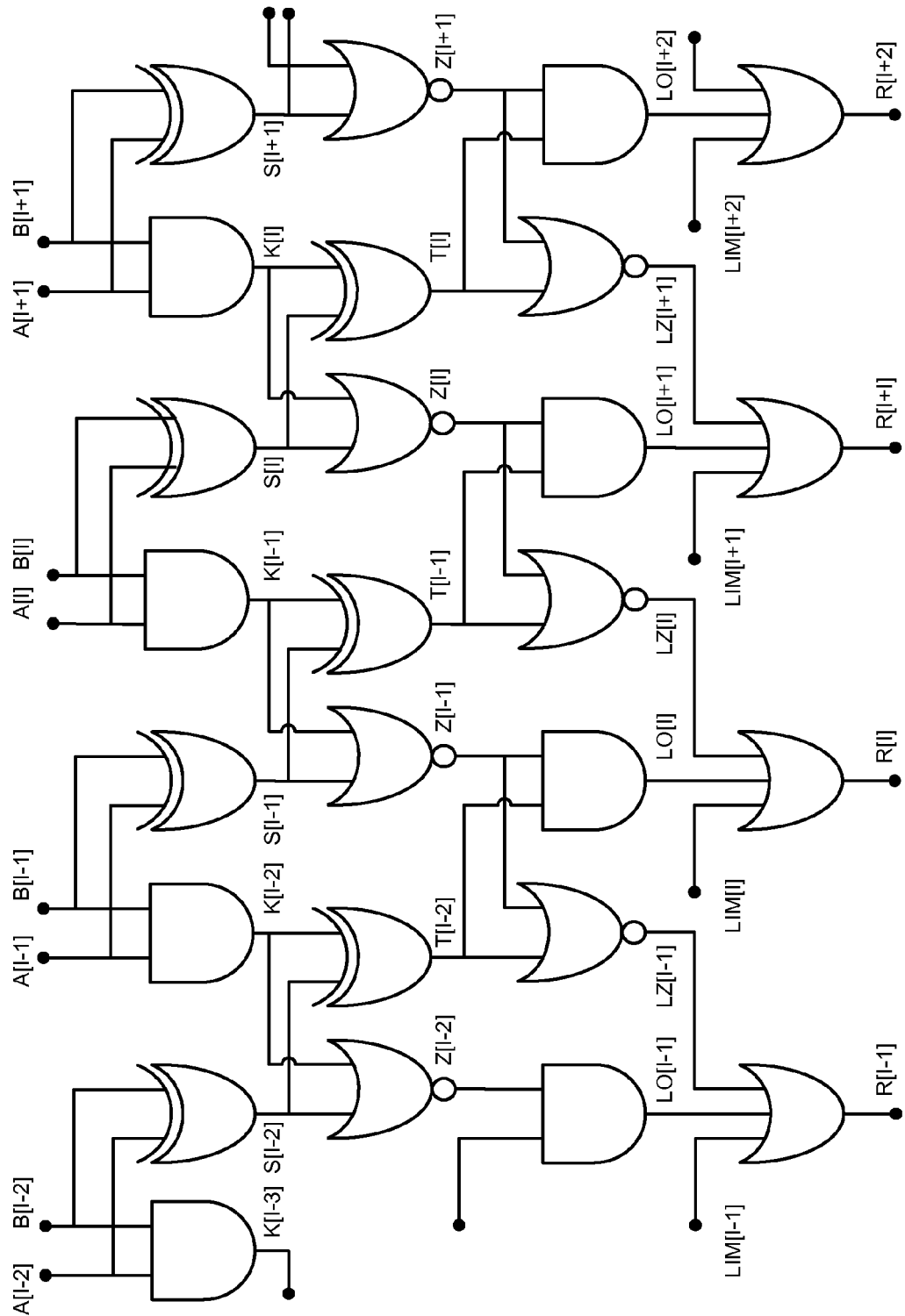
FIG. 9 presents a circuit diagram of a circuit that computes $R_i=LO_i$ OR $LZ_i$ OR $LIM_i$ in accordance with embodiments of the present invention.

If the position of the smallest exponent cannot be in one of two locations for the underflow case, then embodiments of the present invention compute:

$S_i = A_i$ XOR $B_i$; //half-adder sum $K_i = A_{i+1}$ AND $B_{i+1}$; //half-adder carry $T_i = S_i$ XOR $K_i$; //T $Z_i = $ NOT $(S_i$ OR $K_i)$; //Z $LZ_i = $ NOT$(T_{i-1}$ OR $Z_i)$; //leading zero detect $LO_i = T_{i-2}$ AND $Z_{i-1}$; and //leading one detect $R_i = LO_i$ OR $LZ_i$ OR $LIM_i$. //stop position+underflow limit Note that FIG. 9 presents a circuit diagram of a circuit that computes $R_i = LO_i$ OR $LZ_i$ OR $LIM_i$ in accordance with embodiments of the present invention.

Computation of S and K Outside the Leading Zero Anticipator

In embodiments of the present invention, a half add is performed before the addition (i.e., before A and B are sent to the functional element that performs the floating-point ADD operation). Thus, in these embodiments, the half add is done before the floating-point operands are sent to the LZA module and to the adder. In this case, the LZA shown in FIG. 4 computes:

$T_{i-1} = S_{i-1}$ XOR $K_{i-1}$; //$T_{i-1}$

NOT$(Z_i) = S_i$ OR $K_i$; and //NOT$(Z_i)$ $R_i = T_{i-1}$ XOR NOT$(Z_i)$. //stop position which requires only three gates for each bit position in a floating-point number in the LZA. On the other hand, the LZA shown in FIG. 8 computes:

$T_i = S_i$ XOR $K_i$; //T $Z_i = $ NOT$(S_i$ OR $K_i)$; //Z $LZ_i = $ NOT$(T_{i-1}$ OR $Z_i)$; //leading zero detect $LO_i = T_{i-2}$ AND $Z_{i-1}$; and //leading one detect $R_i = LO_i$ OR $LZ_i$. //stop position which requires only five gates for each bit position in a floating-point number in the LZA. These embodiments are significant improvements in area, speed, and power consumption over existing LZA designs.

Floating-Point ADD Operation

Figure 10A:
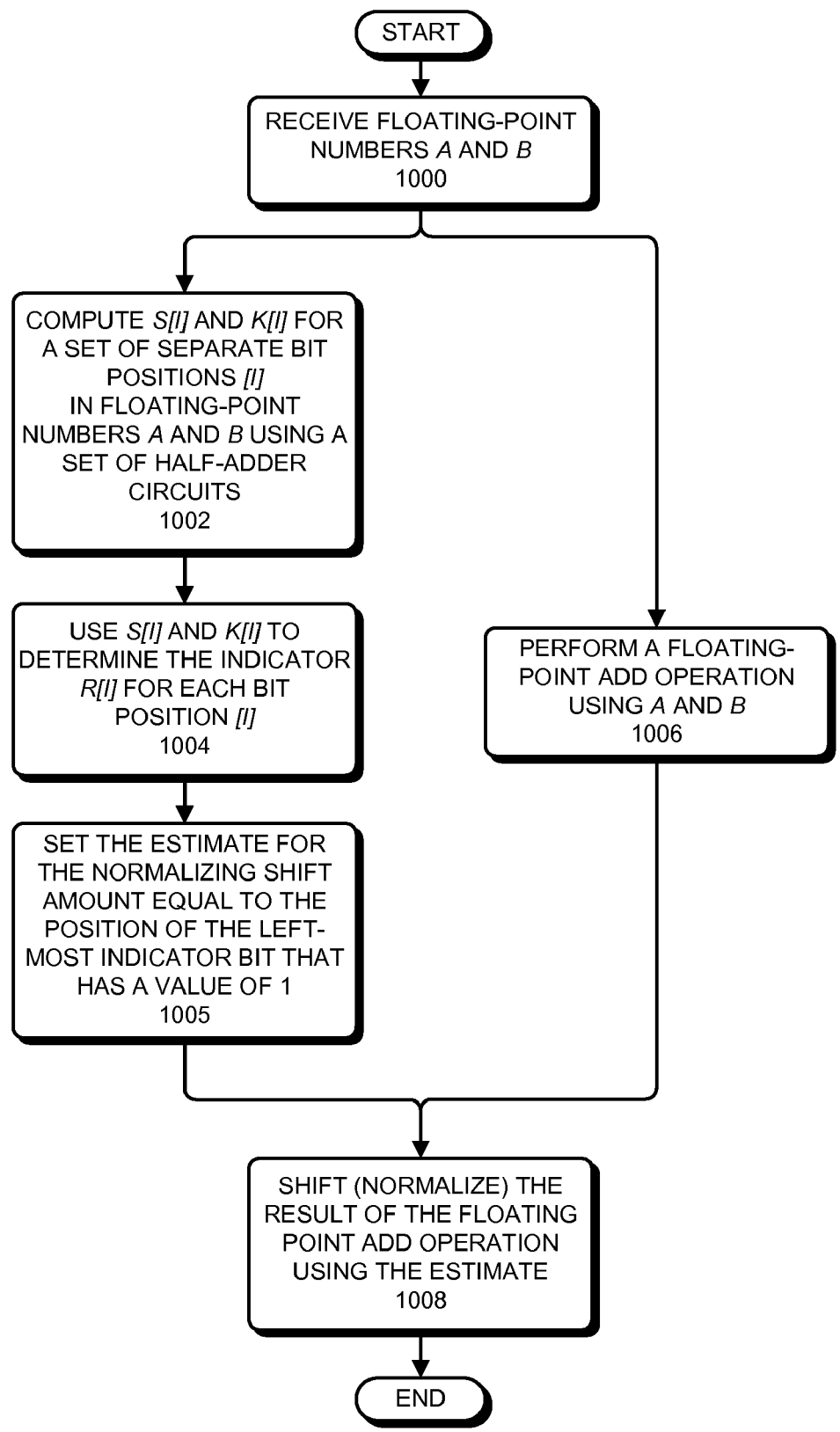
FIG. 10A presents a flowchart illustrating the process of performing a floating-point ADD operation in accordance with embodiments of the present invention.

FIG. 10A presents a flowchart illustrating the process of performing a floating-point ADD operation in accordance with embodiments of the present invention. The process starts when a system that performs a floating-point ADD operation receives floating-point numbers A and B (step 1000).

The system sends A and B to an adder and to an LZA. The LZA computes $S_i$ and $K_i$ for a set of separate bit positions i in the floating-point numbers using half-adder circuits (step 1002). The LZA then uses $S_i$ and $K_i$ to determine the indicator $R_i$ for each bit position i (step 1004). The system next sets the estimate for the normalizing shift amount equal to the position of the left-most indicator bit that has a value of 1 (step 1005). In parallel, the adder performs a floating-point ADD operation using A and B (step 1006). The system then shifts (normalizes) the result of the floating-point ADD operation using the estimate (step 1008).

Figure 10B:
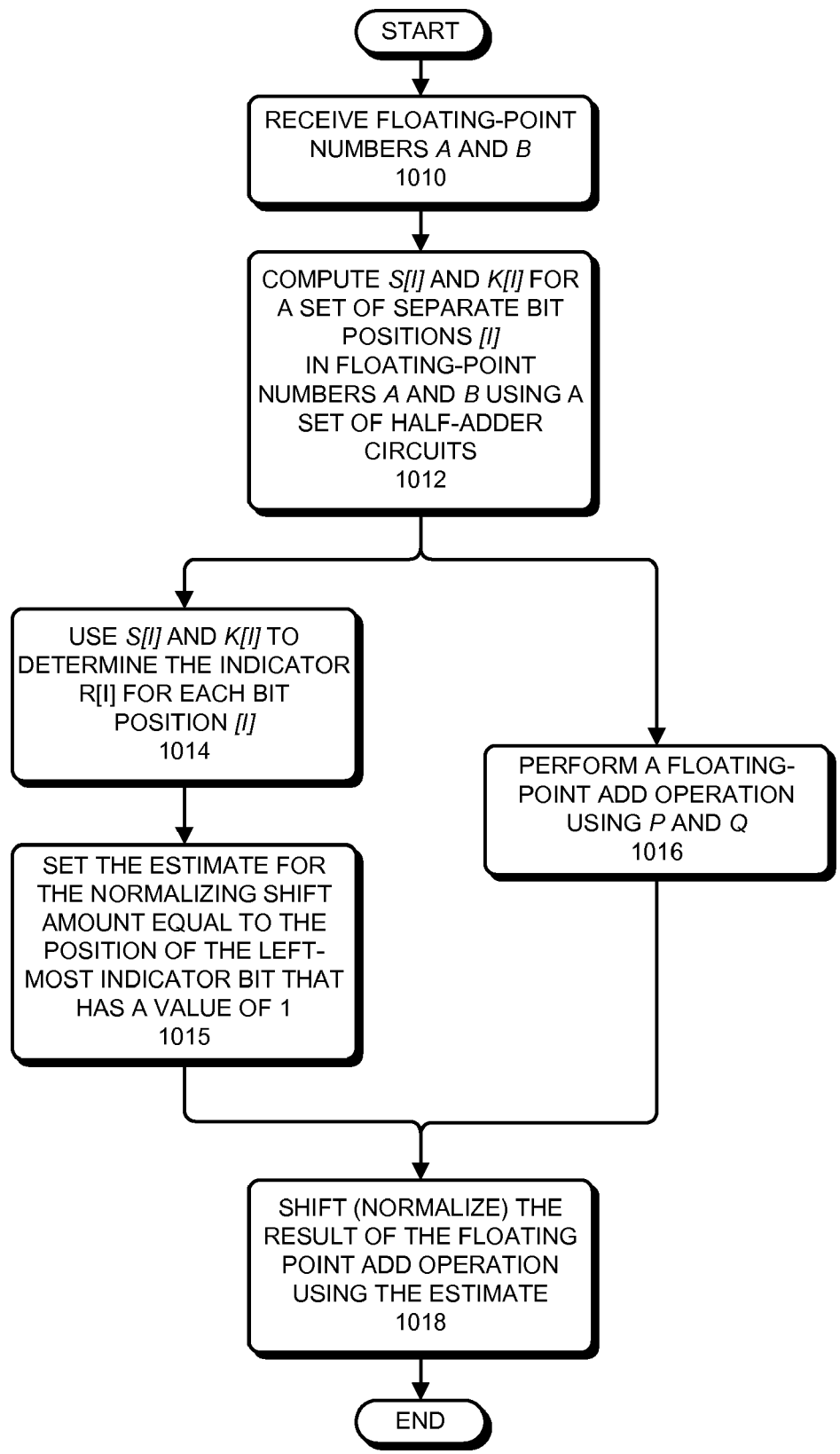
FIG. 10B presents a flowchart illustrating the process of performing a floating-point ADD operation in accordance with embodiments of the present invention.

FIG. 10B presents a flowchart illustrating the process of performing a floating-point ADD operation in accordance with embodiments of the present invention. The process starts when a system that performs a floating-point ADD operation receives floating-point numbers A and B (step 1010).

The system then computes $S_i$ and $K_i$ for a set of separate bit positions i in the floating-point numbers using half-adder circuits (step 1012). Next, the system uses $S_i$ and $K_i$ to determine the indicator $R_i$ for each bit position i (step 1014). The system then sets the estimate for the normalizing shift amount equal to the position of the left-most indicator bit that has a value of 1 (step 1015). In parallel, the system creates P and Q from the $S_i$ and $K_i$ for each bit position i so that the ith bit of P is $S_i$ and the ith bit of Q is $K_i$. The adder then performs a floating-point ADD operation using P and Q (step 1016). Next, the system shifts (normalizes) the result of the floating-point ADD operation using the estimate (step 1018).

Figure 11:
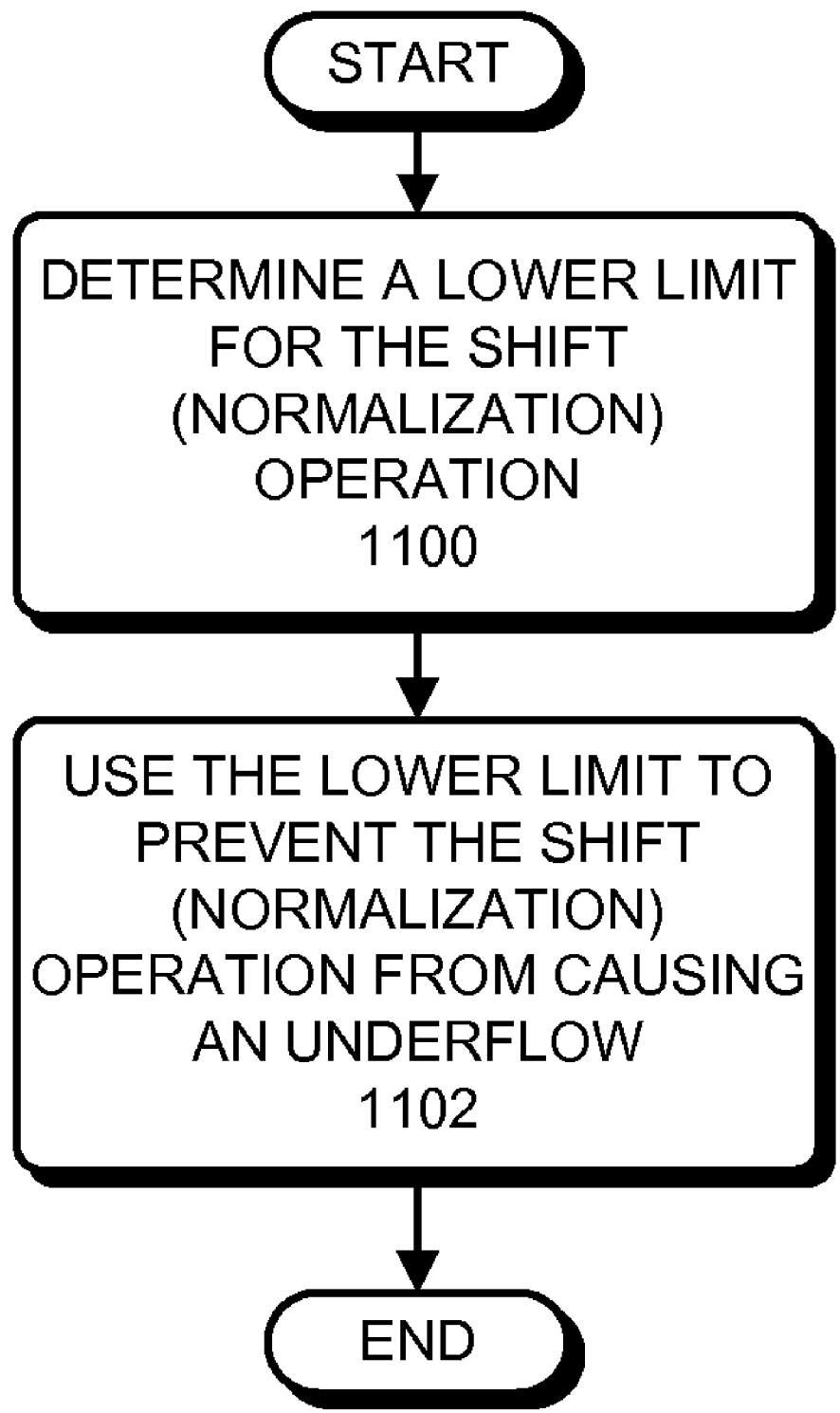
FIG. 11 presents a flowchart illustrating the process of preventing underflow in accordance with embodiments of the present invention.

FIG. 11 presents a flowchart illustrating the process of preventing underflow in accordance with embodiments of the present invention. Note that the process of preventing underflow occurs partly before and partly in step 1004 for FIG. 10A or step 1014 for FIG. 10B. However, the process occurs before the shift (normalization) operation in step 1008 or 1018.

The process starts when the system determines a lower limit for the shift (normalization) operation (step 1100). The system determines the lower limit of the shift operation by determining what the largest possible shift can be without causing the normalized result to underflow. The system then uses the lower limit to prevent the shift (normalization) operations from causing an underflow (step 1102).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that estimates a location of a leading zero or a leading one in a result of an addition of floating-point numbers A and B, comprising:
   a set of half-adder circuits, wherein each half-adder circuit is associated with a separate bit position i in floating-point numbers A and B and wherein each half-adder circuit computes a sum (S) for the associated bit position of A and B and a carry (K) for a next bit position of A and B; and
   a set of estimation circuits coupled to the set of half-adder circuits, wherein the set of estimation circuits computes an estimate for the location of the leading zero or the leading one in the result from the K and S computed by each half-adder circuit,
   wherein each half-adder circuit comprises an XOR gate to calculate $S_i = A_i$ XOR $B_i$ and an AND gate to calculate $K_{i-1} = A_i$ AND $B_i$, for each separate bit position i in A and B; and
   wherein all the estimation circuits comprise one of:
      a first circuit that comprises an XOR gate to calculate $T_{i-1} = S_{i-1}$ XOR $K_{i-1}$, an OR gate to calculate NOT$(Z_i) = S_i$ OR $K_i$, and an XOR gate to calculate $R_i = T_{i-1}$ XOR NOT$(Z_i)$ for each separate bit position i in A and B, wherein, when the estimation circuits comprise the first circuit, if the result is positive, a first occurrence from left to right of $R_i = 1$ provides a value of i such that the leading one is at location i or i−1 in the result, and if the result is negative, the first occurrence from left to right of $R_i = 1$ provides the value of i such that the leading zero is at location i or i+1 in the result;
      a second circuit that comprises an XOR gate to calculate $T_{i-1} =$ XOR $K_{i-1}$, a NOR gate to calculate $Z_i =$ NOT($S_i$ OR $K_i$), and an XNOR gate to calculate $R_i =$ NOT($T_i − 1$ XOR $Z_i$), for each separate bit position i in A and B, wherein, when the estimation circuits comprise the second circuit, if the result is positive, a first occurrence from left to right of $R_i = 1$ provides a value of i such that the leading one is at location i or i−1 in the result, and if the result is negative, the first occurrence from left to right of $R_i = 1$ provides the value of i such that the leading zero is at location i or i+1 in the result; or
      a third circuit that comprises an AND gate to calculate $K_i = A_{i+1}$ AND $B_{i+1}$, an XOR gate to calculate $T_i = S_i$ XOR $K_i$, a NOR gate to calculate $Z_i =$ NOT($S_i$ OR $K_i$), a NOR gate to calculate $LZ_i =$ NOT($T_{i-1}$ OR $Z_i$), an AND gate to calculate $LO_i = T_{i-2}$ AND $Z_{i-1}$, and an OR gate to calculate $R_i = LO_i$ OR $LZ_i$, for each separate bit position i in A and B, wherein, when the estimation circuits comprise the third circuit, for a positive result or negative result that has been complemented, a first occurrence from left to right of $R_i = 1$ provides a value of i such that the leading one is at location i or i−1 in the result.

2. The apparatus of claim 1, wherein, when the estimation circuits comprise the first circuit, each estimation circuit comprises an OR gate to calculate R_LIM$_i = R_i$ OR LIM$_i$, wherein LIM$_i = 1$ for a bit position i such that the result cannot be shifted beyond i without underflowing.

3. The apparatus of claim 1, wherein, when the estimation circuits comprise the first circuit, the apparatus further comprises:
   a shift-and-complement circuit coupled to a circuit that computes the result of the addition of floating-point numbers A and B, wherein the shift-and-complement circuit includes a set of two-input multiplexers, wherein each multiplexer receives as inputs the separate bit position i of the result and an inverted value of bit position i+1 of the result;
   wherein if the result is negative, the inverted value of bit position i+1 is selected as an output from each multiplexer, and wherein if the result is positive, bit position i is selected as the output from each multiplexer; and
   wherein following the shift-and-complement circuit, the first occurrence from left to right of $R_i = 1$ provides the value of i such that the leading zero is at location i or i−1 in the result.

4. The apparatus of claim 1, wherein, when the estimation circuits comprise the second circuit, each estimation circuit comprises an OR gate to calculate R_LIM$_i = R_i$ OR LIM$_i$, wherein LIM$_i = 1$ for a bit position i such that the result cannot be shifted beyond i without underflowing.

5. The apparatus of claim 1, wherein, when the estimation circuits comprise the third circuit, the OR gate used to calculate $R_i$ further comprises an input LIM$_i$, wherein the OR gate calculates $R_i = (LZ_i$ OR LOi OR LIM$_i$), wherein LIM$_i = 1$ for a bit position i such that the result cannot be shifted beyond i without underflowing.

6. A device that estimates a location of a leading zero or a leading one in a result of an addition of floating-point numbers A and B, comprising:
   a processor;
   a memory coupled to the processor, wherein the memory stores instructions for the processor;
   a set of half-adder circuits on the processor, wherein each half-adder circuit is associated with a separate bit position i in floating-point numbers A and B and wherein each half-adder circuit computes a sum (S) for the associated bit position of A and B and a carry (K) for a next bit position of A and B; and
   a set of estimation circuits on the processor that are coupled to the set of half-adder circuits, wherein the set of estimation circuits computes an estimate for the location of the leading zero or the leading one in the result from the K and S computed by each half-adder circuit,
   wherein each half-adder circuit comprises an XOR gate to calculate $S_i = A_i$ XOR $B_i$ and an AND gate to calculate $K_{i-1} = A_i$ AND $B_i$, for each separate bit position i in A and B; and
   wherein all the estimation circuits comprise one of:
      a first circuit that comprises an XOR gate to calculate $T_{i-1} = S_{i-1}$ XOR $K_{i-1}$, an OR gate to calculate NOT$(Z_i) = S_i$ OR $K_i$, and an XOR gate to calculate $R_i = T_{i-1}$ XOR NOT$(Z_i)$ for each separate bit position i in A and B, wherein, when the estimation circuits comprise the first circuit, if the result is positive, a first occurrence from left to right of $R_i = 1$ provides a value of i such that the leading one is at location i or i−1 in the result, and if the result is negative, the first occurrence from left to right of $R_i = 1$ provides the value of i such that the leading zero is at location i or i+1 in the result;
      a second circuit that comprises an XOR gate to calculate $T_{i-1} = S_{i-1}$ XOR $K_{i-1}$, a NOR gate to calculate $Z_i =$ NOT($S_i$ OR $K_i$), and an XNOR gate to calculate $R_i$=NOT($T_i$−1 XOR $Z_i$), for each separate bit position i in A and B, wherein, when the estimation circuits comprise the second circuit, if the result is positive, a first occurrence from left to right of $R_i$=1 provides a value of i such that the leading one is at location i or i−1 in the result, and if the result is negative, the first occurrence from left to right of $R_i$=1 provides the value of i such that the leading zero is at location i or i+1 in the result; or a third circuit that comprises an AND gate to calculate $K_i$=$A_{i+1}$ AND $B_{i+1}$, an XOR gate to calculate $T_i$=$S_i$ XOR $K_i$, a NOR gate to calculate $Z_i$=NOT($S_i$ OR $K_i$), a NOR gate to calculate $LZ_i$=NOT($T_{i-1}$ OR $Z_i$), an AND gate to calculate $LO_i$=$T_{i-2}$ AND $Z_{i-1}$, and an OR gate to calculate $R_i$=$LO_i$ OR $LZ_i$, for each separate bit position i in A and B, wherein, when the estimation circuits comprise the third circuit, for a positive result or negative result that has been complemented, a first occurrence from left to right of $R_i$=1 provides a value of i such that the leading one is at location i or i−1 in the result.

7. The device of claim 6, wherein, when the estimation circuits comprise the first circuit, each estimation circuit comprises an OR gate to calculate R_$LIM_i$=$R_i$ OR $LIM_i$, wherein $LIM_i$=1 for a bit position i such that the result cannot be shifted beyond i without underflowing.

8. The device of claim 6, wherein, when the estimation circuits comprise the first circuit, the device further comprises:

a shift-and-complement circuit coupled to a circuit that computes the result of the addition of floating-point numbers A and B on the processor, wherein the shift-and-complement circuit includes a set of two-input multiplexers, wherein each multiplexer receives as inputs the separate bit position i of the result and an inverted value of bit position i+1 of the result;

wherein if the result is negative, the inverted value of bit position i+1 is selected as an output from each multiplexer, and wherein if the result is positive, bit position i is selected as the output from each multiplexer; and wherein following the shift-and-complement circuit, the first occurrence from left to right of $R_i$=1 provides the value of i such that the leading zero is at location i or i−1 in the result.

9. The device of claim 6, wherein, when the estimation circuits comprise the second circuit, each estimation circuit comprises an OR gate to calculate R_$LIM_i$=$R_i$ OR $LIM_i$, wherein $LIM_i$=1 for a bit position i such that the result cannot be shifted beyond i without underflowing.

10. The device of claim 6, wherein, when the estimation circuits comprise the third circuit, the OR gate used to calculate $R_i$ further comprises an input $LIM_i$, wherein the OR gate calculates $R_i$=($LZ_i$ OR $LO_i$ OR $LIM_i$), wherein $LIM_i$=1 for a bit position i such that the result cannot be shifted beyond i without underflowing.

11. A method for estimating a location of a leading zero or a leading one in a result of an addition of floating-point numbers A and B, comprising:

using a half-adder circuit associated with each separate bit position i in floating point numbers A and B to compute a sum (S) for the associated bit position of A and B and a carry (K) for a next bit position of A and B; and computing an estimate for the location of the leading zero or the leading one in the result from the K and S computed by each half-adder circuit, wherein using the half-adder circuit to compute S and K for each separate bit position i in A and B involves computing $S_i$=$A_i$ XOR $B_i$ and $K_{i-1}$=$A_i$ AND $B_i$; and wherein computing the estimate for each separate bit position i in A and B comprises, for all bit positions, computing one of:

a first set of values by computing $T_{i-1}$=$S_{i-1}$ XOR $K_{i-1}$, NOT($Z_i$)=$S_i$ OR $K_i$, and $R_i$=$T_{i-1}$ XOR NOT($Z_i$), wherein, when computing the first set of values, if the result is positive, a first occurrence from left to right of $R_i$=1 provides a value of i such that the leading one is at location i or i−1 in the result, and if the result is negative, the first occurrence from left to right of $R_i$=1 provides the value of i such that the leading zero is at location i or i+1 in the result;

a second set of values by computing $T_{i-1}$=$S_{i-1}$ XOR $K_{i-1}$, $Z_i$=NOT($S_i$ OR $K_i$), and $R_i$=NOT($T_i$−1 XOR $Z_i$), wherein, when computing the second set of values, if the result is positive, a first occurrence from left to right of $R_i$=1 provides a value of i such that the leading one is at location i or i−1 in the result, and if the result is negative, the first occurrence from left to right of $R_i$=1 provides the value of i such that the leading zero is at location i or i+1 in the result; or a third set of values by computing $K_i$=$A_{i+1}$ AND $B_{i+1}$, $T_i$=$S_i$ XOR $K_i$, $Z_i$=NOT($S_i$ OR $K_i$), $LZ_i$=NOT($T_{i-1}$ OR $Z_i$), $LO_i$=$T_{i-2}$ AND $Z_{i-1}$, and $R_i$=$LO_i$ OR $LZ_i$, for each separate bit position i in A and B, wherein, when computing the third set of values, for a positive result or negative result that has been complemented, a first occurrence from left to right of $R_i$=1 provides a value of i such that the leading one is at location i or i−1 in the result.

12. The method of claim 11, wherein, when computing the first set of values, the method further comprises computing R_$LIM_i$=$R_i$ OR $LIM_i$, wherein $LIM_i$=1 for a bit position i such that the result cannot be shifted beyond i without underflowing.

13. The method of claim 11, wherein, when computing the first set of values, the method further comprises:

if the result is negative, shifting and complementing the result by selecting an inverted value of bit position i+1 as a value for each separate bit position i in the result;

otherwise, leaving the value of each separate bit position i in the result unchanged;

wherein the first occurrence from left to right of $R_i$=1 provides the value of i such that the leading zero is at location i or i−1 in the result.

14. The method of claim 11, wherein, when computing the second set of values, the method further comprises computing R_$LIM_i$=$R_i$ OR $LIM_i$, wherein $LIM_i$=1 for a bit position i such that the result cannot be shifted beyond i without underflowing.

15. The method of claim 11, wherein, when computing the third set of values, the method further comprises computing $R_i$=($LZ_i$ OR $LO_i$ OR $LIM_i$), wherein $LIM_i$=1 for a bit position i such that the result cannot be shifted beyond i without underflowing.

* * * * *